(12) United States Patent
Bae et al.

(10) Patent No.: US 9,979,673 B2
(45) Date of Patent: May 22, 2018

(54) COMMUNICATION SYSTEM AND OPERATING METHOD THEREOF

(71) Applicant: LSIS CO., LTD., Anyang-si, Gyeonggi-do (KR)

(72) Inventors: Ae Kyoung Bae, Anyang-si (KR); Young In Kim, Seongnam-si (KR); Hong Joo Kim, Seoul (KR); Yoon Sung Cho, Gyeongsan-si (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 117 days.

(21) Appl. No.: 14/970,419

(22) Filed: Dec. 15, 2015

(65) Prior Publication Data
US 2016/0308780 A1 Oct. 20, 2016

(30) Foreign Application Priority Data
Apr. 17, 2015 (KR) .................. 10-2015-0054784

(51) Int. Cl.
*H04L 12/28* (2006.01)
*H04L 12/927* (2013.01)
(Continued)

(52) U.S. Cl.
CPC ............ *H04L 47/805* (2013.01); *G08C 17/02* (2013.01); *H02J 13/0027* (2013.01);
(Continued)

(58) Field of Classification Search
CPC ..... H04L 47/805; H04L 47/781; G08C 17/02; G08C 2201/51; H02J 13/0027; H04J 3/00;
(Continued)

(56) References Cited

U.S. PATENT DOCUMENTS

2009/0254655 A1   10/2009  Kidwell et al.
2011/0106321 A1*  5/2011   Cherian ................... H02J 3/00
                                                 700/286
(Continued)

FOREIGN PATENT DOCUMENTS

EP    1492310    12/2004
EP    2632007    8/2013
(Continued)

OTHER PUBLICATIONS

European Patent Office Application Serial No. 16151358.5, Search Report dated Sep. 7, 2016, 8 pages.
(Continued)

*Primary Examiner* — Alex Skripnikov
*Assistant Examiner* — Lionel Preval
(74) *Attorney, Agent, or Firm* — K&L Gates LLP

(57) ABSTRACT

A communication system is provided. The communication system includes a plurality of remote terminal units (RTUs) outputting a state signal. The communication system includes a communication device receiving the output state signal from each of the plurality of RTUs and generating signal quality information, which is quality information on the received state signal. The communication system includes a control device obtaining the signal quality information and the state signal, determining at least one RTU among the plurality of RTUs as a load according to a preset condition in response to the obtained signal quality information, and generating system analysis information on the plurality of RTUs, which includes the at least one RTU determined as the load, on the basis of the state signal.

2 Claims, 7 Drawing Sheets

(51) Int. Cl.
*H02J 13/00* (2006.01)
*H04L 12/911* (2013.01)
*G08C 17/02* (2006.01)
*H02J 3/00* (2006.01)

(52) U.S. Cl.
CPC ........ *H04L 47/781* (2013.01); *G08C 2201/51* (2013.01); *H02J 3/00* (2013.01); *Y02B 90/2684* (2013.01); *Y02E 60/7884* (2013.01); *Y04S 40/143* (2013.01)

(58) Field of Classification Search
CPC ............ Y02B 90/2684; Y02E 60/7884; Y04S 40/143
See application file for complete search history.

(56) References Cited

U.S. PATENT DOCUMENTS

| | | | |
|---|---|---|---|
| 2013/0214927 A1* | 8/2013 | Kim | G08B 21/185 340/638 |
| 2013/0311800 A1 | 11/2013 | Matsui | |
| 2015/0025700 A1 | 1/2015 | Choi et al. | |
| 2016/0048123 A1* | 2/2016 | Froehner | G05B 19/414 700/214 |

FOREIGN PATENT DOCUMENTS

| | | |
|---|---|---|
| JP | 2006-333699 | 12/2006 |
| JP | 2014-161167 | 9/2014 |
| JP | 2014-175823 | 9/2014 |
| KR | 10-2010-0078323 | 7/2010 |
| KR | 10-1109489 | 2/2012 |
| KR | 10-2014-0005551 | 1/2014 |

OTHER PUBLICATIONS

Yun, et al., "Data Modeling for Developing Baseline Network Analysis Software of Korean EMS System," Trans KIEE, vol. 58, No. 10, Oct. 2009, pp. 1842-1848.

Korean Intellectual Property Office Application Serial No. 10-2015-0054784, Office Action dated Mar. 2, 2016, 4 pages.

* cited by examiner

COMMUNICATION SYSTEM AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0054784, filed on Apr. 17, 2015 the contents of which are all hereby incorporated by reference herein in its entirety.

BACKGROUND

The present disclosure relates to a communication system and an operating method thereof, and particularly, to a communication system and an operating method, which generate system analysis information on a remote terminal unit (RTU) of a supervisory control and data acquisition (SCADA) system to control each RTU.

A SCADA system is defined as a communication system for collecting, receiving, recording, and displaying, at a remote control center (RCC), state signal data (or points) of a plurality of RTUs using an analog or digital signal on a communication path and allowing the RCC to supervise and control each of the remote RTUs.

The SCADA system is typically a system for supervising and controlling, in a centralized manner, many kinds of remote facilities such as power generation, transmission, and distribution facilities, a petrochemical plant, an iron and steel making facility, and a factory automation facility, etc.

In detail, the RCC of the SCADA system periodically obtains a state signal (or state value) at determined times, generates system analysis information (or unique algorithm) used for controlling the plurality of remote control units on the basis of the obtained state signals, and controls each of the RTUs on the basis of the generated system analysis information.

Furthermore, the RCC may receive the state signal (or value) (e.g. "open" or "close") from each RTU and at the same time, receive signal quality information (e.g. "good" or "suspect") including whether each state signal is normal or erroneous, generate RTU analysis information, which is analysis information on each RTU, in correspondence to the received signal quality information, and may collect the RTU analysis information on each RTU to generate system analysis information that is analysis information on the plurality of RTUs.

FIGS. 1A, 1B, and 1C illustrate an operation for receiving a state signal from each RTU to generate analysis information on each RTU on the basis thereof.

For example, as illustrated in FIG. 1A, when receiving, from a circuit breaker, a "close" (i.e. connected) state signal together with normal signal information (e.g. "good") that includes information that the corresponding "close" state signal is normal, a control device 100 generates RTU analysis information that a "circuit breaker" is "connected" on the basis of the corresponding "close" state signal, and generates system analysis information for analyzing the plurality of RTUs including the "connected" "circuit breaker" by reflecting the RTU analysis information of "circuit breaker is connected".

On the other hand, for example, as illustrated in FIG. 1B, when receiving, from a circuit breaker, a "close" (i.e. connected) state signal together with erroneous signal information (e.g. "suspect") including information that the corresponding "close" state signal is erroneous, the control device 100 generates RTU analysis information that "the circuit breaker" is "open" on the basis of the "open" state signal received together at the time of receiving "good" signal quality data which is last received before receiving "suspect" signal quality data, instead of the corresponding "close" state signal, in response to the erroneous signal information ("e.g. suspect"), and reflects the RTU analysis information to generate the system analysis information for analyzing the plurality of RTUs in which the "opened circuit breaker" is included.

However, in practice, each state signal and each piece of signal quality information are not simultaneously transmitted to a control device 100 due to various causes, including delay on a communication line, and are received with a time difference as illustrated in FIG. 1C.

For example, at the time of "(1)" of FIG. 1C, the control device 100 receives a "close" state signal in a state of receiving "good" signal quality information.

Theoretically, the control device 100 is necessary to generate system analysis information on a plurality of RTUs, in which an "opened circuit breaker" is included, on the basis not of the "close" state signal, but of an "open" state signal that is a state signal received together when receiving last "good" signal quality information, in response to "suspect" signal quality information indicating that the received "close" state signal is erroneous.

In practice, though not required to use the "close" state signal, the control device 100 uses the "close" state signal in response to "good" signal quality information that is most recently received before receiving the "close" state signal, generates RTU analysis information that the "circuit breaker" is "connected" on the basis of the "close" state signal, and reflects this to generate system analysis information on the plurality of RTUs in which the "connected circuit breaker" is included.

In addition, for example, at the time of "(2)" of FIG. 1C, the control device 100 receives an "open" state signal in a state of receiving "suspect" signal quality information.

At this point, the control device 100 is necessary to generate the system analysis information on the plurality of RTUs in which an "opened circuit breaker" is included, on the basis of the "open" state signal in response to the "good" signal quality information indicating that the received "open" state signal is not erroneous but is normal.

However, in practice, the control device 100 generates system analysis information that the "circuit breaker" is "connected", not on the basis of the "open" state signal in response to "suspect" signal quality information having already received right before receiving the "open" state signal, but on the basis of the "close" state signal in response to last "good" signal quality information before receiving the "open" state signal, and accordingly, generates the system analysis information on the plurality of RTUs in which the "connected circuit breaker" is included.

Consequently, since reception times of a state signal and signal quality information are typically different due to various causes such as a delay issue on a communication line, an error occurs and matching is degraded in generating the system analysis information on the RTUs, which outputs a state signal on the basis of a state signal.

SUMMARY

Embodiments provide a communication system and operation method thereof capable of reducing occurrence of errors and improving matching at the time of generating system analysis information on each remote terminal unit (RTU).

In one embodiment, a communication system includes: a plurality of remote terminal units (RTUs) outputting a state signal; a communication device receiving the output state signal from each of the plurality of RTUs and generating signal quality information, which is quality information on the received state signal; and a control device obtaining the signal quality information and the state signal, determining at least one RTU among the plurality of RTUs as a load according to a preset condition in response to the obtained signal quality information, and generating system analysis information on the plurality of RTUs, which includes the at least one RTU determined as the load, on the basis of the state signal.

In another embodiment, an operating method of a communication system, includes: receiving a state signal output from each of a plurality of RTUs; generating signal quality information that is quality information on the state signal; determining at least one RTU among the plurality of RTUs as a load according to the signal quality information and a preset condition; and generating system analysis information on the plurality of RTUs, which includes the at least one RTU determined as the load, on the basis of the state signal.

The details of one or more embodiments are set forth in the accompanying drawings and the description below. Other features will be apparent from the description and drawings, and from the claims.

DETAILED DESCRIPTION OF THE EMBODIMENTS

Figure 1A:
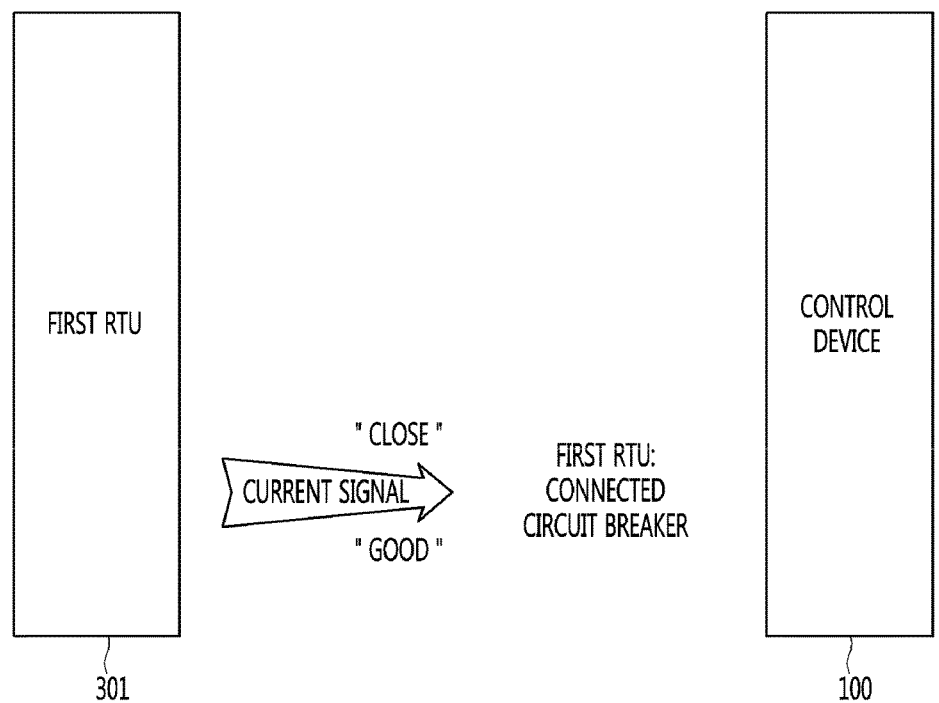
FIG. 1A, 1B, 1C illustrates a typical operation for receiving a state signal from each RTU to generate analysis information on each RTU.
Figure 1B:
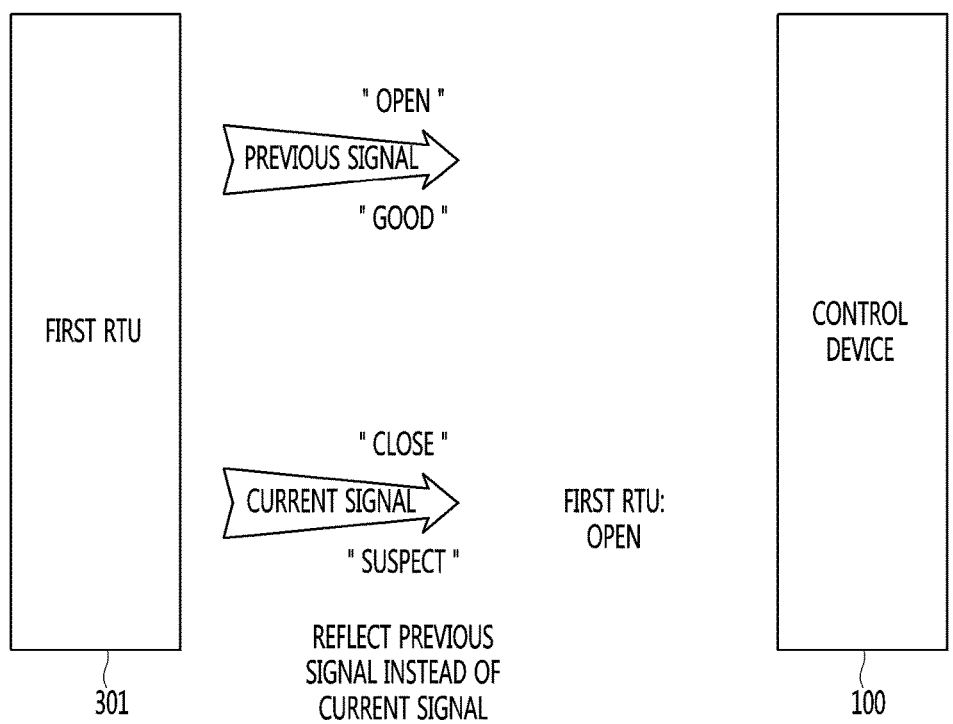
Figure 1C:
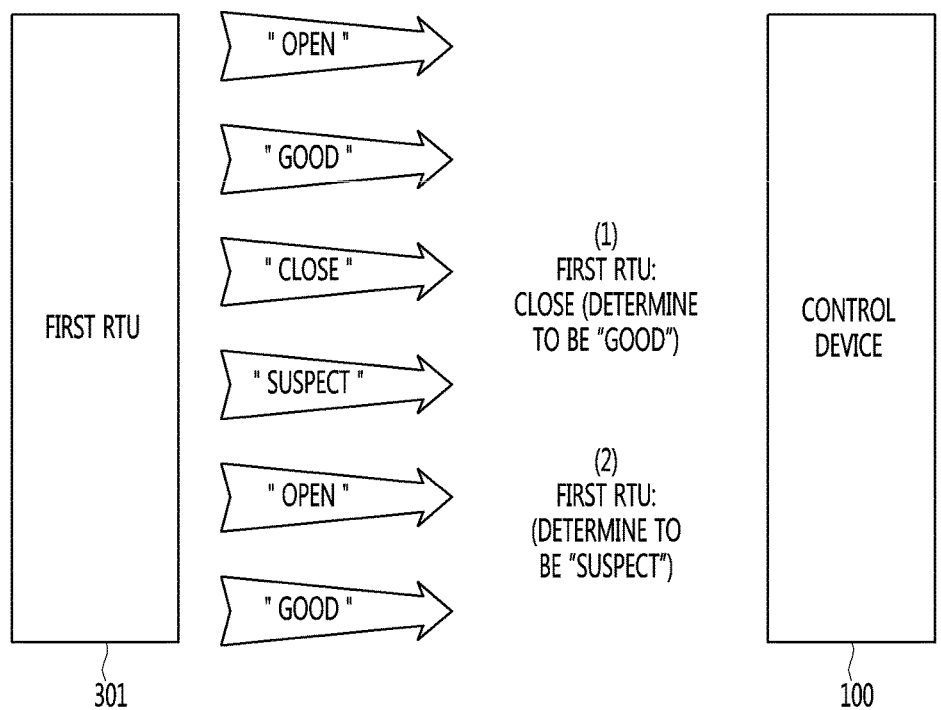

Hereinafter, the embodiments will now be described in detail with reference to the accompanying drawings. However, the disclosure cannot be limited to the embodiment in which the idea of the disclosure is presented, and another embodiment included within range of idea of another backward disclosure or the present disclosure may be easily proposed by addition, change, deletion and the like of another element.

In the following description, detailed descriptions of well-known functions or constructions will be omitted since they would obscure the invention in unnecessary detail. Moreover, numerals (e.g., first, second, etc.) in the description are used only to distinguish one element from another.

The terms used in this specification were selected to include current, widely-used general terms. In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present disclosure.

It will be understood that when an element is referred to as being "connected" or "coupled" to another element, it may be directly connected or coupled to the other element or intervening elements may be present in between unless otherwise specified.

In other words, throughout this specification, when an element is referred to as "including" a component, it does not preclude another component but may further include the other component unless the context clearly indicates otherwise.

Hereinafter, embodiments of the present invention will be described in detail with reference to the accompanying drawings. It should be noted that the same reference numerals are used to designate the same or similar elements throughout the drawings.

Hereinafter, referring to FIGS. 2 to 5, a description will be provided about a method for generating system analysis information on a plurality of remote terminal units (RTUs).

Figure 2:
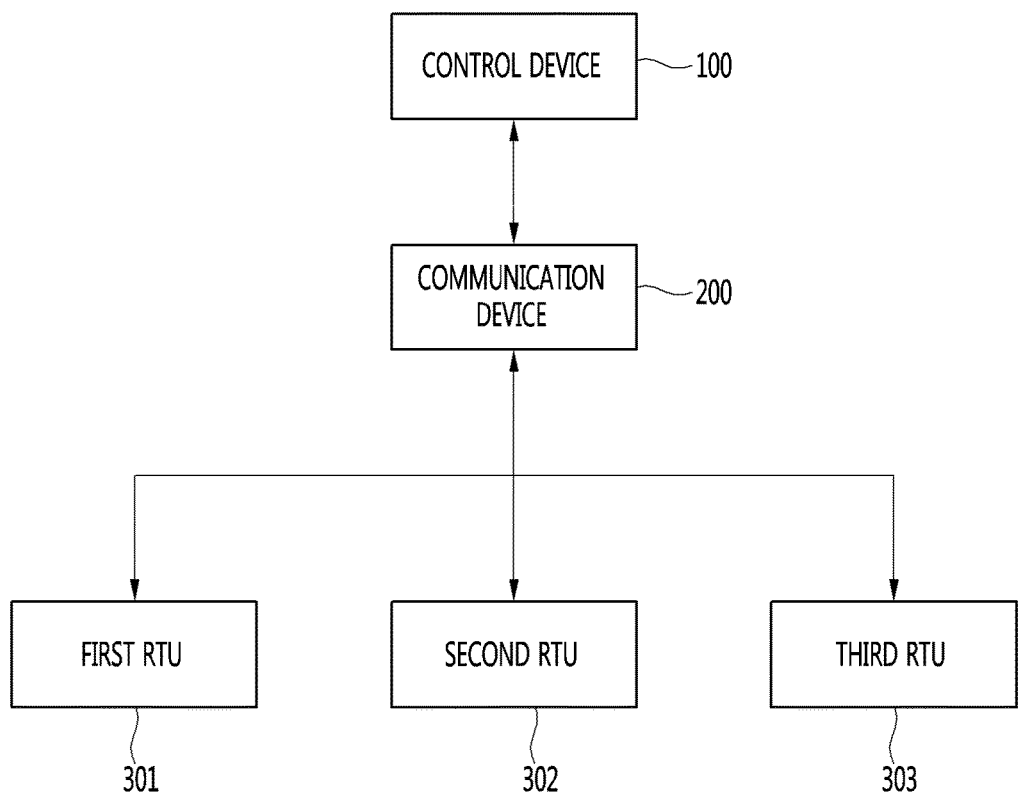
FIG. 2 is a block diagram illustrating a communication system according to an embodiment.

FIG. 2 is a block diagram illustrating a communication system according to an embodiment.

Referring to FIG. 2, a communication system according to an embodiment may include a control device 100, a communication device 200, and a plurality of RTUs 301, 302, and 303. In FIG. 2, for convenience of explanation, it is assumed that the first to third RTUs 301, 302, and 303 are included. However, the number of RTUs included in the communication system is not limited to three, and may be diversely varied according to embodiments.

Each RTU 301, 302, or 303 may transmit a state signal including state information (e.g. a DC voltage value) thereon to the communication device 200.

The communication device 200 may transmit a state signal received from each RTU to the control device 100.

In addition, the communication device 200 may transmit signal quality information (e.g. "GOOD" or "SUSPECT") including quality information on the state signal received from each RTU 301, 302, or 303.

The control device 100 may receive the state signal for each RTU and signal quality information on each of the state signals, which are transmitted from the communication device 200.

On the basis of the received state signal, the control device 100 may generate analysis information on a corresponding RTU that has transmitted the state signal.

The control device 100 may generate system analysis information, which is analysis information on the plurality of RTUs in the entire communication system, on the basis of the generated analysis information on each RTU.

The control device 100 may control each RTU 301, 302, or 303 through the communication device 200 on the basis of the generated system analysis information.

Figure 3:
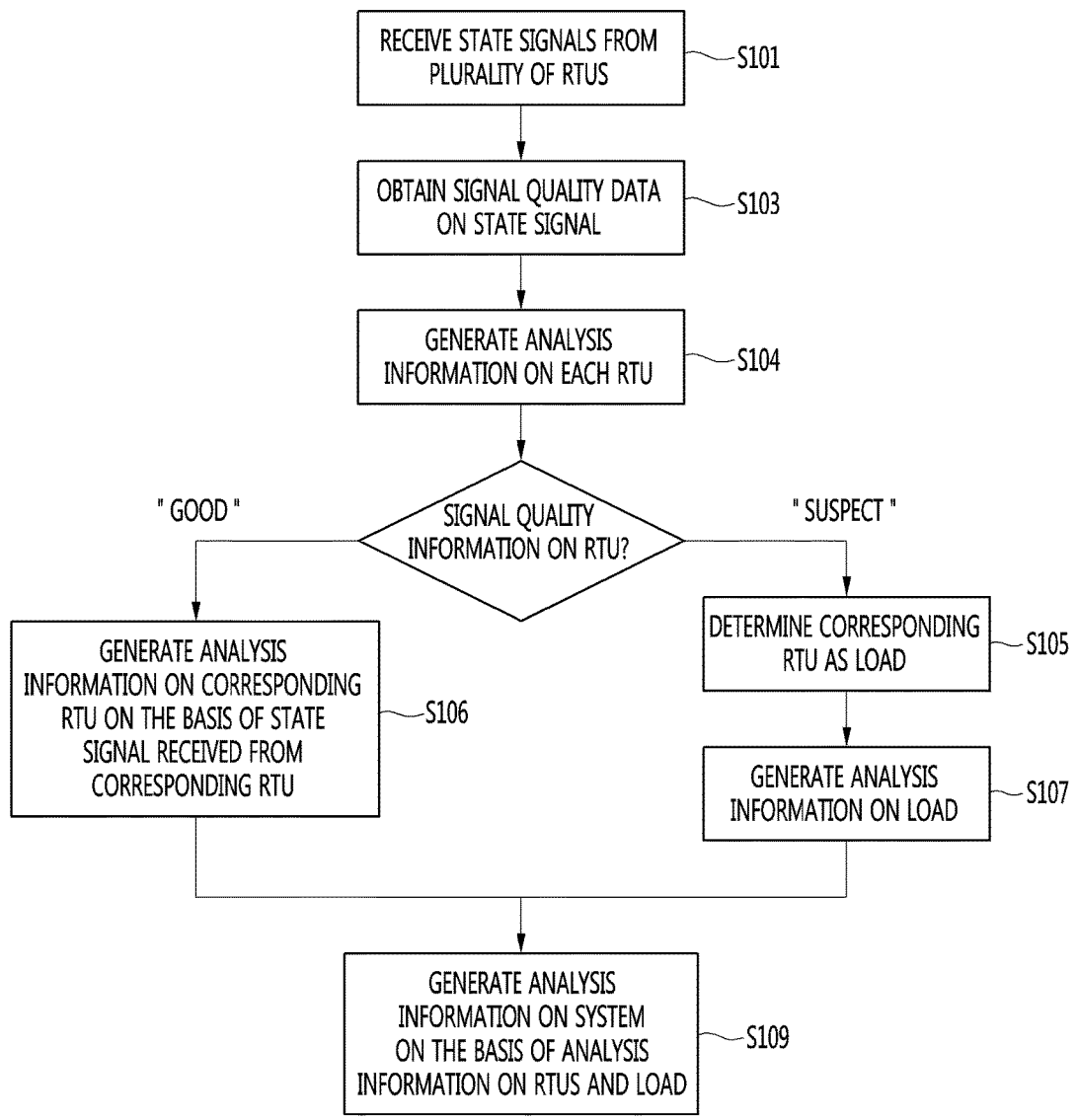
FIG. 3 is a flowchart illustrating a method for generating system analysis information according to an embodiment.

FIG. 3 is a flowchart illustrating a method for generating system analysis information according to an embodiment.

Referring to FIG. 3, the control device 100 (of FIG. 2) receives state signals from the plurality of RTUs through the communication device 200 (of FIG. 2) (operation S101).

When receiving the state signal, the control device 100 receives signal quality information on each state signal from the communication device 200 (operation S103).

The control device 100 generates analysis information on each RTU in response to the received signal quality information (operation S104).

When the analysis information on each RTU is generated, it is determined whether signal quality information on the state signal received from a specific RTU is "SUSPECT (erroneous signal information)" or "GOOD (normal signal information)"

When the signal quality information on the state signal received from the specific RTU is "SUSPECT", the control device 100 determines the corresponding RTU as a load in response to the "SUSPECT" (operation S105).

In this case, the control device 100 generates the analysis information on the RTU, which is determined as the load (operation S107).

On the other hand, when the signal quality information on the state signal received from the specific RTU is "GOOD", the control device 100 generates, in response to "GOOD", the analysis information on the corresponding RTU on the basis of the state signal received from the corresponding RTU (operation S106).

As described above, when the analysis information on each RTU (or RTUs and loads) is generated, the control device 100 generates system analysis information that is analysis information on the plurality of RTUs, which includes the RTU determined as the load, on the basis of the analysis information on each RTU (operation S109).

Figure 4:
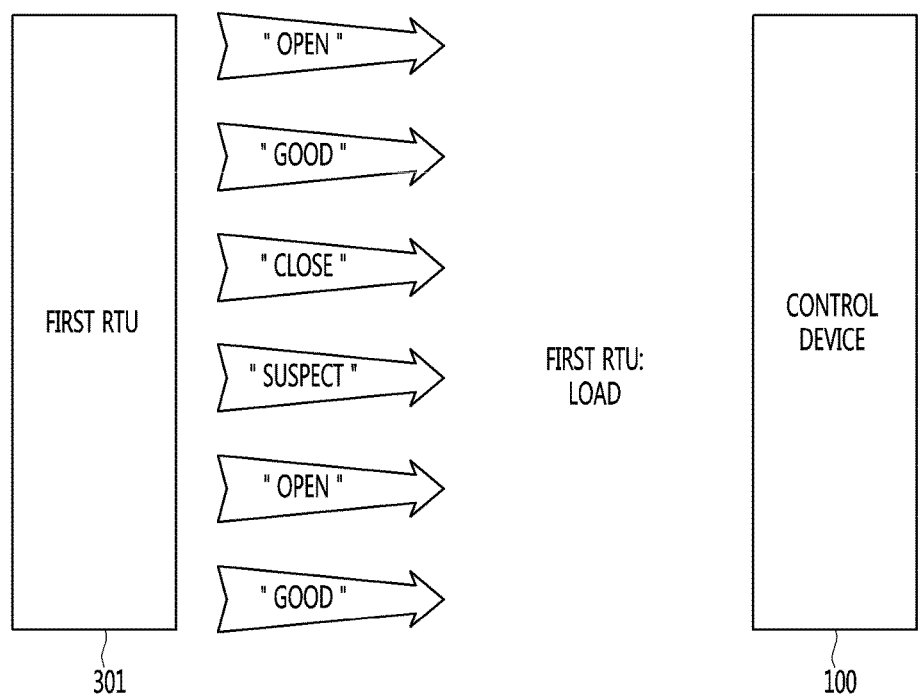
FIG. 4 illustrates an operation for generating analysis information on a first RTU according to an embodiment.

FIG. 4 illustrates an operation for generating analysis information on a first RTU according to an embodiment.

A first RTU may transmit, to the control device 100, a state signal (e.g. "open" or "close") and signal quality information (e.g. "good" or "suspect") including information of whether the state signal is normal or erroneous.

Referring to FIG. 4, the first RTU may transmit "OPEN", "GOOD", "CLOSE", "SUSPECT", "OPEN", and "GOOD" in that order to the control device 100 through the communication device 200 (of FIG. 2).

After receiving the "CLOSE" signal, the control device 100 may receive "SUSPECT", which is the signal quality information on the "CLOSE" signal, and determine the first RTU 301 outputting the "CLOSE" signal as a load in response to the "SUSPECT".

The control device 100 may determine the first RTU 301 as the load, and generate system analysis information on the plurality of RTUs (not illustrated) in which the first RTU 301 determined as the load is included.

Figure 5:
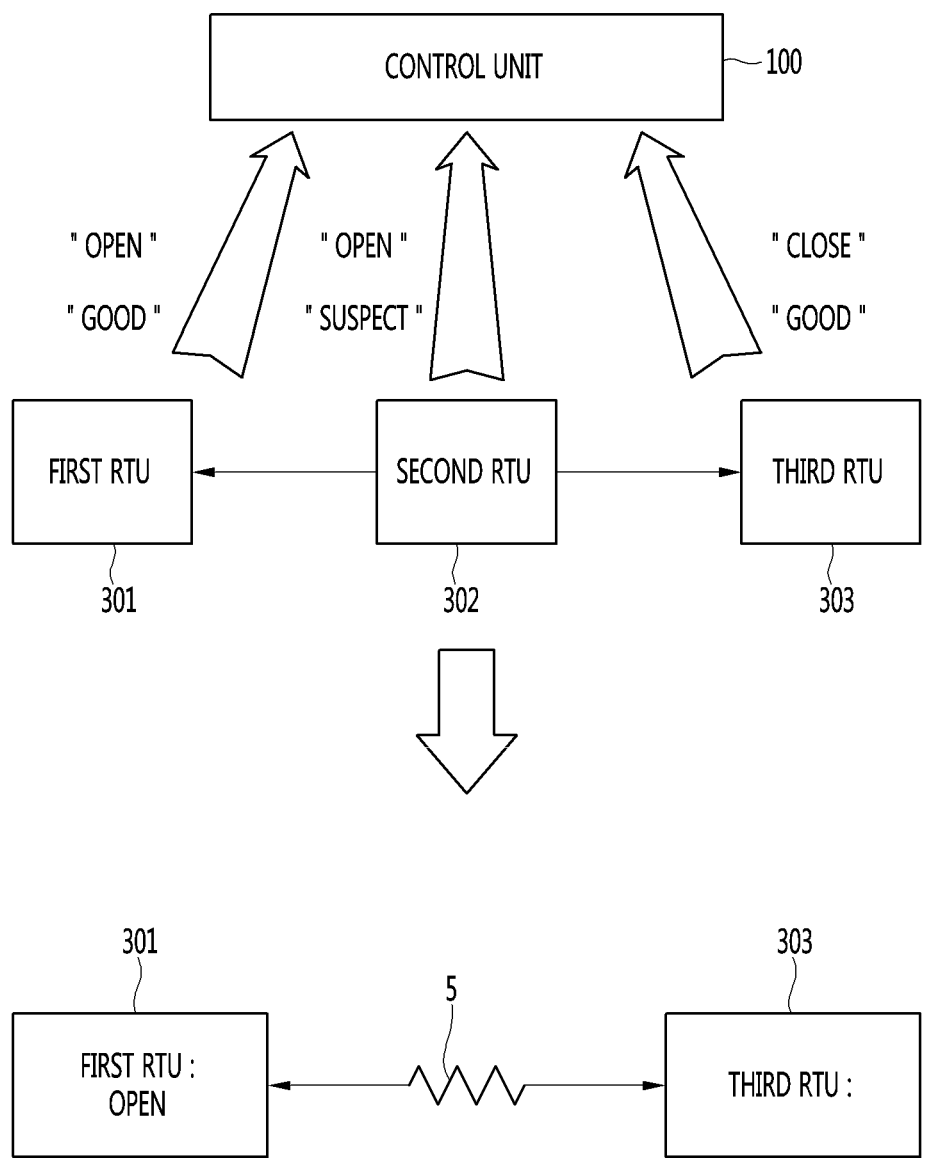
FIG. 5 illustrates an operation for generating analysis information on each RTU to generate system analysis information.

FIG. 5 illustrates an operation for generating analysis information on each RTU to generate system analysis information.

Referring to FIG. 5, the first RTU 301 transmits an "OPEN" state signal to the control device 100, and the control device 100 may receive the "OPEN" state signal and signal quality information of "GOOD", which indicates that the "OPEN" state signal is normal, through a communication device (not illustrated).

In addition, the second RTU 302 transmits an "OPEN" state signal to the control device 100, and the control device 100 may receive the "OPEN" state signal and signal quality information of "SUSPECT", which indicates that the "OPEN" state signal is erroneous, through the communication device.

In addition, the third RTU 303 transmits an "CLOSE" state signal to the control device 100, and the control device 100 may receive the "CLOSE" state signal and signal quality information of "GOOD", which indicates that the "CLOSE" state signal is normal, through the communication device.

When the state signal from each of the RTUs 301, 302, and 303 and the signal quality information through the communication device are received, the control device 100 may generate each piece of RTU analysis information based on each state signal in response to the receive signal quality information.

As illustrated in FIG. 5, the control device 100 may generate the RTU analysis information of "the first RTU: OPEN", which is the analysis information on the first RTU 301, on the basis of the "OPEN" state signal, in response to "GOOD" signal quality information on the "OPEN" state signal transmitted from the first RTU 301.

In addition, the control device 100 may generate the RTU analysis information of "the third RTU: CLOSE", which is the analysis information on the third RTU 303, on the basis of the "CLOSE" state signal, in response to "GOOD" signal quality information on the "CLOSE" state signal transmitted from the third RTU 303.

On the other hand, the control device 100 may generate RTU analysis information of "load 5" for the second RTU 302 on the basis of the "OPEN" state signal, in response to "SUSPECT" signal quality information on the "OPEN" state signal transmitted from the second RTU 302.

The control device 100 may generate the system analysis information, which is analysis information on the plurality of RTUs (the first to third RTUs) 301, 302, and 303, on the basis of the RTU analysis information of "the first RTU: OPEN", "the third RTU: CLOSE" and "the second RTU: load".

According to an embodiment, when signal quality information of suspect, which is obtained from individual facilities forming a power system, is sustained, it may be considered that there is not a corresponding facility. In detail, when the signal quality information on the individual facilities, which form the power system, is sustained as "suspect", the power system may be reduced and analyzed by handling, as a load, a portion without information thereon due to "suspect" in order not to affect values obtained from other connected facilities.

Accordingly, an issue that an error may occur in analysis of a power system may be addressed by using the existing last good data.

When the system analysis information is generated, the control device 100 may generate a control signal (e.g. a CLOSE command for the first RTU) for controlling each RTU 301, 302, and 303 on the basis of the generated system analysis information and may transmit the generated control signal to the first RTU 301 through the communication device (not illustrated).

According to an embodiment, the above-described method may be implemented as a processor-readable code on a medium with a program recorded thereon. Examples of the computer readable recording medium include a read-only memory (ROM), random-access memory (RAM), CD-ROMs, magnetic tapes, floppy disks, and optical data storage devices, and also include carrier waves (such as data transmission through the Internet).

According to the operating method of the communication system according to the embodiment, an analysis for the entire RTUs (i.e. system) including an RTU, from which an error is detected, may be more accurately and efficiently performed by analyzing the RTU as a load without using a state signal output from the RTU.

As can be seen from the foregoing, the above-described embodiments are not limited to the configurations and methods of the embodiments described above, but the entirety of or a part of the embodiments may be configured to be selectively combined such that various modifications of the embodiments can be implemented.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A communication system comprising:
   a plurality of remote terminal units (RTUs) configured to output a state signal;
   a communication device configured to receive the output state signal from each of the plurality of RTUs and generate signal quality information of the state signal, wherein the signal quality information represents whether the state signal is normal or erroneous; and
   a control device configured to:
   receive the state signal from the plurality of RTUs through the communication device,
   receive the signal quality information from the communication device,
   determine whether the signal quality information of the state signal received from the plurality of RTUs is erroneous signal information or normal signal information,
   when it is determined that at least one RTU among the plurality of RTUs has a normal state signal based on the signal quality information, generate analysis information for the at least one RTU based on the normal state signal of the at least one RTU,
   when it is determined that the signal quality information corresponding to a specific RTU among the plurality of RTUs is the erroneous signal information, determine the specific RTU as a resistor load so that values obtained from the at least one RTU are not affected, and generate analysis information for the specific RTU based on the state signal of the specific RTU, wherein the signal quality information corresponding to the specific RTU is received after receiving a state signal of the specific RTU, and
   generate system analysis information for the plurality of RTUs based on the analysis information of the at least one RTU and the analysis information of the specific RTU by analyzing the specific RTU as the resistor load without using the state signal of the specific RTU,
   wherein the control device controls each of the plurality of RTUs on a basis of the generated system analysis information.

2. An operating method of a communication system, the operating method comprising:
   outputting, by a plurality of remote terminal units (RTUs), a state signal;
   generating, by a communication device, signal quality information of the state signal, wherein the signal quality information of the state signal represents whether the state signal is normal or erroneous;
   receiving, by a control device, the state signal from the plurality of RTUs through the communication device;
   receiving, by the control device, the signal quality information from the communication device;
   determining whether the signal quality information on the state signal received from the plurality of RTUs is erroneous signal information or normal signal information,
   when it is determined that at least one RTU among the plurality of RTUs has a normal state signal based on the signal quality information, generating analysis information for the at least one RTU based on the normal state signal of the at least one RTU,
   when it is determined that the signal quality information corresponding to a specific RTU among the plurality of RTUs is the erroneous signal information, determining the specific RTU as a resistor load so that values obtained from the at least one RTU are not affected, and generating analysis information on the specific RTU based on the state signal of the specific RTU, wherein the signal quality information corresponding to the specific RTU is received after receiving a state signal of the specific RTU, and
   generating system analysis information for the plurality of RTUs based on the analysis information of the at least one RTU and the analysis information of the specific RTU by analyzing the specific RTU as the resistor load without using the state signal of the specific RTU,
   controlling each of the plurality of RTUs on a basis of the generated system analysis information.

* * * * *